US008074765B2

(12) United States Patent
Goto et al.

(10) Patent No.: US 8,074,765 B2
(45) Date of Patent: Dec. 13, 2011

(54) SOUND ABSORBING STRUCTURE OF ELECTRONIC EQUIPMENT

(75) Inventors: Akira Goto, Hadano (JP); Akio Idei, Hadano (JP); Shigeyasu Tsubaki, Odawara (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 12/752,781

(22) Filed: Apr. 1, 2010

(65) Prior Publication Data
US 2010/0187037 A1    Jul. 29, 2010

Related U.S. Application Data

(63) Continuation of application No. 12/074,109, filed on Feb. 28, 2008, now Pat. No. 7,712,576.

(30) Foreign Application Priority Data

Mar. 19, 2007    (JP) .................................. 2007-069756

(51) Int. Cl.
| | |
|---|---|
| E04B 1/82 | (2006.01) |
| E04F 17/04 | (2006.01) |
| F01N 13/00 | (2010.01) |
| G10K 11/00 | (2006.01) |
| G10K 11/04 | (2006.01) |
| H02K 5/24 | (2006.01) |
| H05K 7/20 | (2006.01) |

(52) U.S. Cl. ........ 181/225; 181/200; 181/202; 181/205; 181/224; 181/292; 361/690; 361/696; 361/698

(58) Field of Classification Search .................. 181/225, 181/224, 200, 202, 205, 292; 361/690, 696, 361/698; 415/211.1
See application file for complete search history.

(56) References Cited

U.S. PATENT DOCUMENTS

| 4,894,749 | A  * | 1/1990 | Elko et al. ...................... 361/690 |
|---|---|---|---|
| 6,481,527 | B1 * | 11/2002 | French et al. .................. 181/201 |
| 6,582,192 | B2 * | 6/2003 | Tseng ......................... 415/211.1 |
| 6,776,707 | B2 * | 8/2004 | Koplin ........................... 454/184 |
| 6,819,563 | B1 * | 11/2004 | Chu et al. ...................... 361/696 |
| 7,712,576 | B2 * | 5/2010 | Goto et al. ..................... 181/225 |
| 7,872,865 | B2 * | 1/2011 | Matsushima et al. ......... 361/695 |
| 2004/0100770 | A1 * | 5/2004 | Chu et al. ...................... 361/698 |
| 2004/0182799 | A1 * | 9/2004 | Tachibana ........................ 211/26 |
| 2004/0190247 | A1 * | 9/2004 | Chu et al. ...................... 361/696 |
| 2006/0054380 | A1 * | 3/2006 | Doll .............................. 181/225 |
| 2006/0185931 | A1 * | 8/2006 | Kawar .......................... 181/202 |

FOREIGN PATENT DOCUMENTS

| JP | 63-145392 A | 9/1988 |
|---|---|---|
| JP | 03-48293 A | 5/1991 |
| JP | 05-226864 A | 9/1993 |

* cited by examiner

*Primary Examiner* — Elvin G Enad
*Assistant Examiner* — Christina Russell
(74) *Attorney, Agent, or Firm* — Kilpatrick Townsend & Stockton LLP

(57) ABSTRACT

In order to provide sound absorbing structure capable of reducing the noise of electronic equipment while maintaining the cooling capability of the electronic equipment, there is provided sound absorbing structure in which a plurality of penetrating openings are provided by arranging a plurality of acoustic materials having a predetermined shape at predetermined intervals in a flow channel of cooling fluid from a blower, and the plurality of acoustic materials are arranged so that the sound vertically incident on a penetrating plane of the penetrating openings from the blower does not directly go out of the electronic equipment.

9 Claims, 5 Drawing Sheets blower fans

SOUND ABSORBING STRUCTURE OF ELECTRONIC EQUIPMENT

CROSS-REFERENCE TO RELATED APPLICATION

This application is a continuation application of U.S. patent application Ser. No. 12/074,109, filed on Feb. 28, 2008, which claims priority from Japanese Application JP-2007-069756 filed on Mar. 19, 2007, the content of which, is hereby incorporated by reference into this application.

BACKGROUND OF THE INVENTION

1. Field of the Invention

The present invention relates to sound absorbing structure of electronic equipment having the structure for cooling a heat generating element by means of a blower.

2. Description of Related Art

It is common knowledge that the development of a semiconductor used for electronic equipment, especially of a semiconductor as typified by a CPU of information processing equipment is remarkable, and the semiconductor heads for high heat generating amount and high density. In this connection, due to increase of the mounting number of blowers for cooling and the revolution speed of the blower, the noise value of the equipment also tends to increase. On the other hand, the frequency of placing the electronic equipment in an office room increases, and therefore the demand of decreasing noise of the electronic equipment becomes strong. Accordingly, sound absorbing structure using an acoustic material is often disposed in the vicinity of the blower in an electronic equipment case, or in a rack cabinet and the like outside the electronic equipment case where the electronic equipment is installed. In the case of the conventional sound absorbing structure providing a sound absorbing channel by combining a plurality of acoustic materials as shown in FIG. 10, the volume of the sound absorbing structure per se becomes large, and therefore there have been many restrictions on an installation space, handling, and the like. Further, due to its imbalanced sound absorbing structure in which the plurality of acoustic materials are combined, the distribution of cooling fluid becomes uneven, which may be an obstacle to uniform cooling of the inside of the electronic equipment. In addition, while the recent electronic equipment basically has the same substrate and sheet metal structure in its inside, it becomes often the case that the equipment is used across several generations by replacing a CPU mounted in its inside. Therefore, the revolution speed of the blower has been changed in order to obtain the cooling capability adequate to each generation, and the sound absorbing structure has been changed in response to allowable fluid resistance of the internal equipment.

The conventional sound absorbing structure is also shown in JP-A-5-226864, JP-U-3-48293 and JP-U-63-145392, for example.

BRIEF SUMMARY OF THE INVENTION

FIG. 10 shows the sound absorbing structure of the conventional general electronic equipment. In the conventional sound absorbing structure shown in FIG. 10, there have been the following problems. When trying to obtain sufficient sound absorbing performance without becoming an obstacle to the cooling of the electronic equipment 24, a large volume has been needed since it is necessary to form a sound absorbing channel using a plurality of acoustic materials 26-29 in order to ensure a sufficient ventilation and sound absorbing space 30. Further, if the ventilation and sound absorbing space 30 is formed so that an outlet 32 can be directly viewed from an inlet 31, there has been the danger that incident sound is not absorbed and passes through the ventilation and sound absorbing space. In addition, there has been the danger that the imbalanced sound absorbing structure in which the plurality of acoustic materials are combined causes dispersion of the distribution of cooling fluid and the pressure loss caused when the cooling fluid passes, which may be an obstacle to uniform cooling of the inside of the electronic equipment. Furthermore, in the case of using CPUs across several generations even if the electronic equipment is the same, there has been the possibility that the sound absorbing structure has to be changed in each case since the allowable fluid resistance generated when passing thorough the sound absorbing space which also works as an airflow opening may vary.

Accordingly, the present invention provides sound absorbing structure of electronic equipment in which a plurality of penetrating openings are provided by arranging a plurality of acoustic materials having a predetermined shape in a flow channel of cooling fluid from a blower at predetermined intervals, characterized in that the plurality of acoustic materials are arranged so that the sound vertically incident on a penetrating plane of the penetrating openings from the blower does not directly go out of the electronic equipment.

In addition, the present invention is characterized in that the penetrating opening consists of a V-shaped channel.

By installing the sound absorbing structure of the present invention in an air intake and discharge direction inside or outside a case of the electronic equipment equipped with the blower, it is possible to reduce the noise of the electronic equipment while maintaining the cooling capability of the electronic equipment. Further, by changing the installation place, the number or the angle of basic sound absorbing members of the sound absorbing structure, it becomes possible to cope with the change in size of the rack cabinet, and the change in required cooling capability across several generations of the CPU inside the electronic equipment.

Moreover, since the penetrating opening is a passing opening of the cooling fluid and at the same time is a space where the sound collides to be absorbed, if the area of the penetrating plane is the same, the attenuation of the sound becomes larger as the length of the channel becomes long. Accordingly, since the sound absorbing structure of the present invention comprises a large number of penetrating openings which becomes inclined or curved long sound absorbing channels, the volume necessary for the sound absorbing structure can be made compact. Moreover, since the distribution of the cooling fluid before and behind the penetrating openings and the pressure loss generated when the cooling fluid passes can be made uniform by arranging the position and the size of the penetrating opening so as to be in a well-balanced state, the sound absorbing structure of the present invention does not disturb the cooling capability.

Other objects, features and advantages of the invention will become apparent from the following description of the embodiments of the invention taken in conjunction with the accompanying drawings.

DETAILED DESCRIPTION OF THE INVENTION

Figure 1:
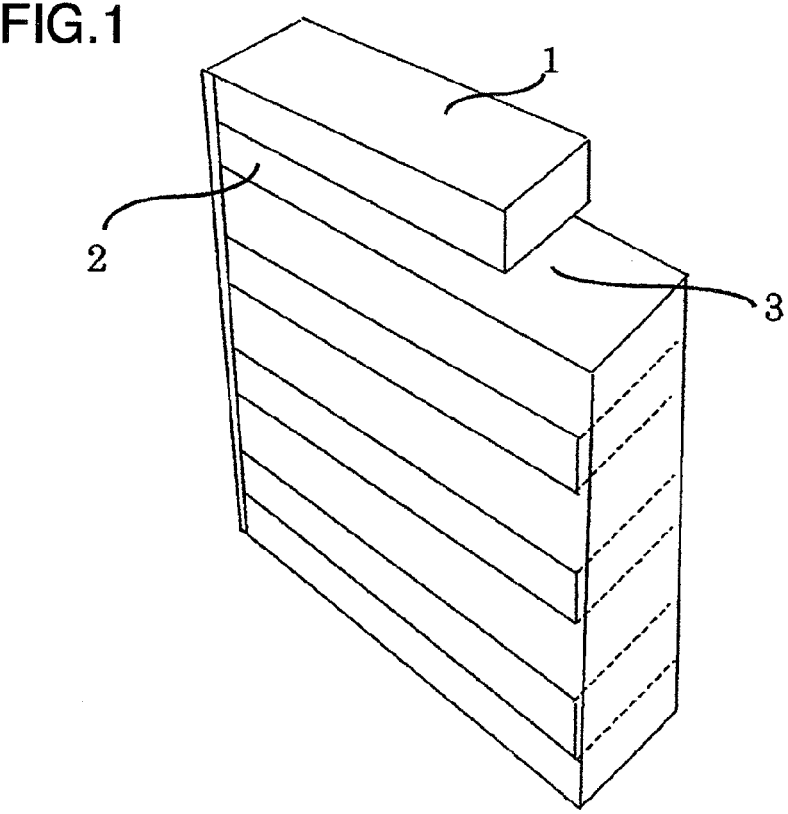
FIG. 1 is a general view of a first embodiment of the present invention.
Figure 2:
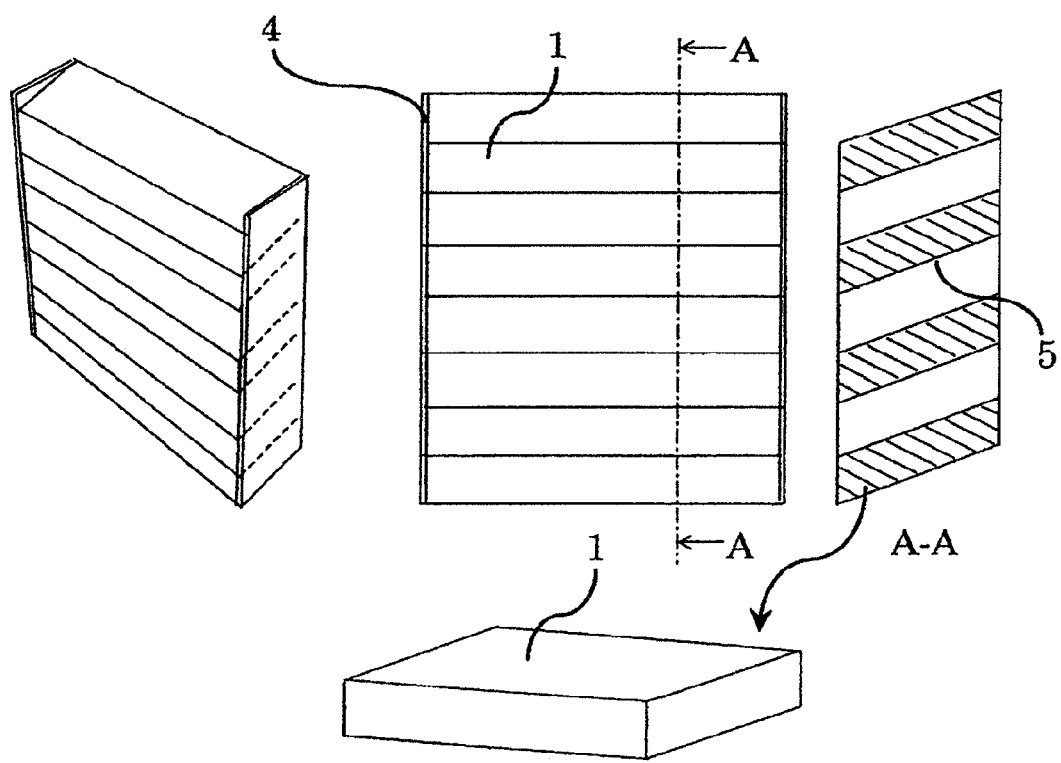
FIG. 2 is front and side views of the first embodiment of the present invention.

FIG. 1 shows a general view of a first embodiment of the present invention. This is a sound absorbing member in which an inclined channel is provided in a penetrating opening so that a noise source cannot be seen when a penetrating plane is viewed from the front, and FIG. 2 shows a front view and a side view of the first embodiment. The sound absorbing member 1 is constituted by a sound absorbing structural body as typified by glass wool, polyurethane foam and the like, which is a base unit constituting the sound absorbing member. These sound absorbing members 1 are provided with threaded holes on both sides, and are screwed to a plate material 4 to constitute integrated sound absorbing structure. The opening size and the opening area ratio of the penetrating opening 2 are changed by a pitch of the sound absorbing members 1 according to its operating condition.

Figure 10:
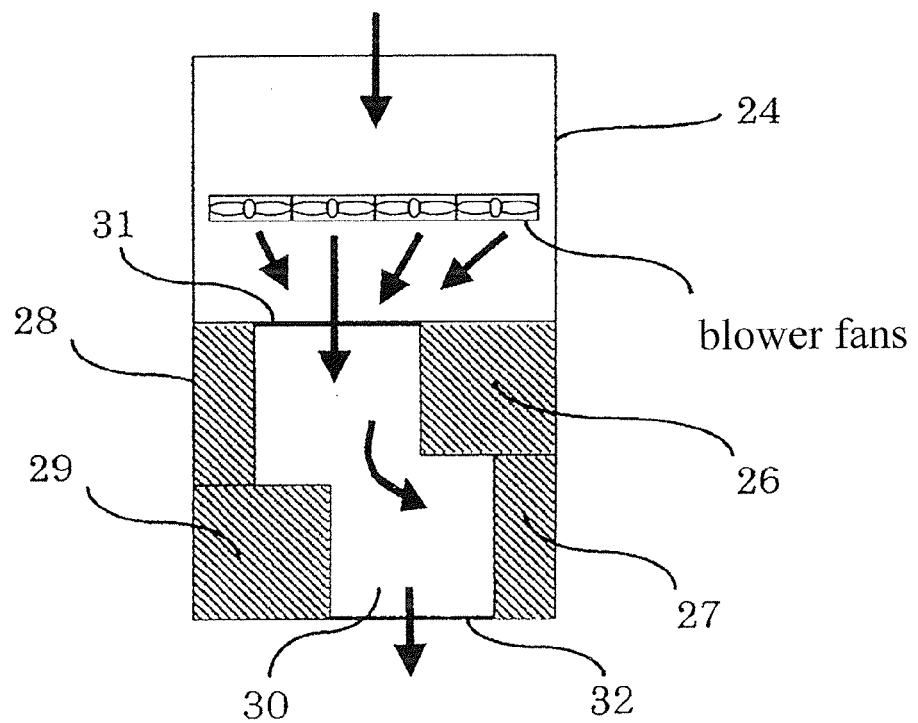
FIG. 10 is a sectional view of conventional sound absorbing structure of electronic equipment.

The fluid passes through the channel 3 of the penetrating opening of the acoustic material. The sound is absorbed and damped at the channel 3 of the penetrating opening. When the conventional ventilation and sound absorbing space 30 as shown in FIG. 10 is formed so that the outlet 32 can be directly viewed from the inlet 31, there has been the danger that incident sound is not be absorbed while passing through the ventilation and sound absorbing space 29. In the case of the acoustic material of the present invention, the sound vertically incident on the penetrating plane collides against an inclined surface 5 in the channel of the penetrating openings with slope, and is absorbed.

Figure 3:
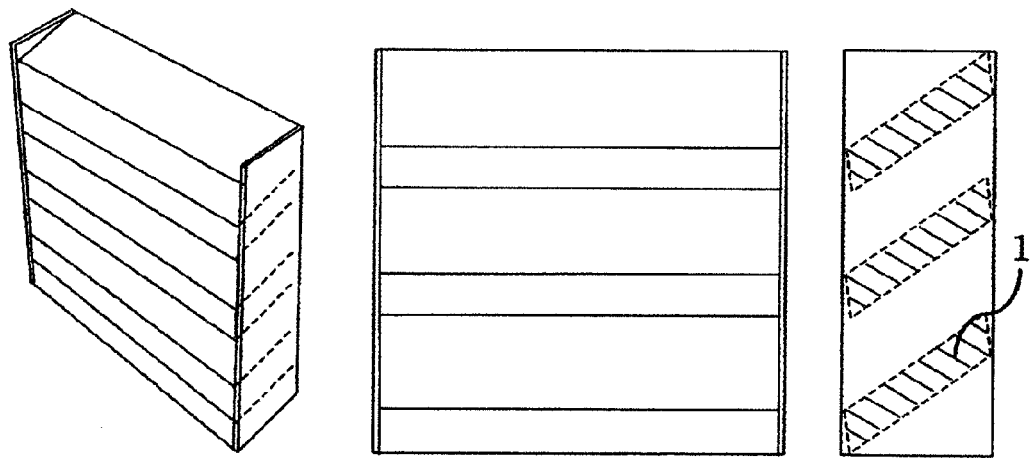
FIG. 3 is front and side views of a second embodiment of the present invention.

FIG. 3 shows a second embodiment of the present invention. The composition basic members of this embodiment are quite the same as FIG. 1. However, the number of the basic sound absorbing members 1, the connecting point with the plate material 4, and the inclination with respect to the plate material 4 are changed, and thereby it is possible to change not only the sound absorbing effect but also the fluid resistance.

Figure 4:
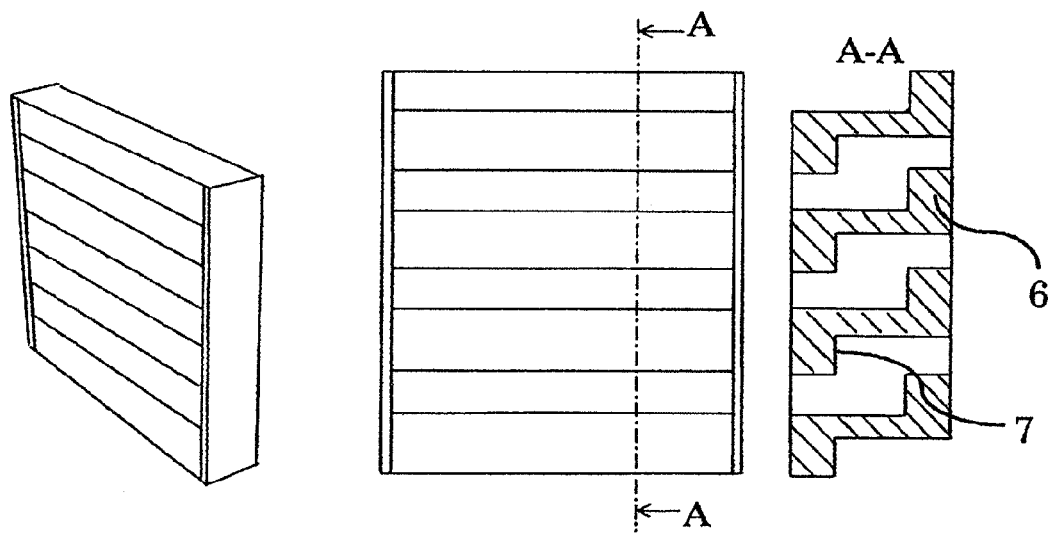
FIG. 4 is front and side views of a third embodiment of the present invention.

FIG. 4 shows a third embodiment of the present invention. The basic composition member in this embodiment is an acoustic material in which a curved channel is provided in the penetrating opening so that the noise source cannot be seen when the penetrating plane is viewed from the front. The sound vertically incident on the penetrating plane collides against a wall surface 7 consisting of a curved basic member 6, and is absorbed.

Figure 5:
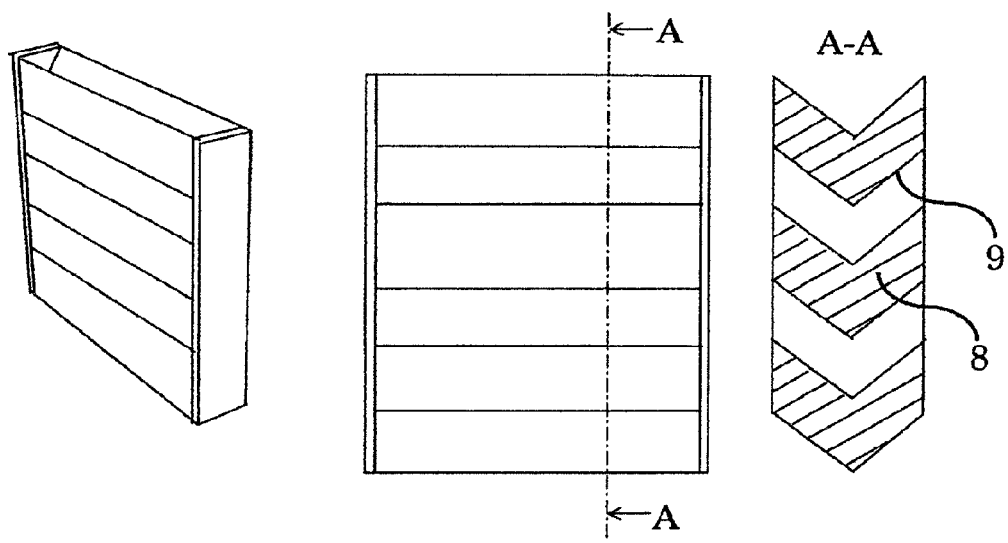
FIG. 5 is front and side views of a fourth embodiment of the present invention.

FIG. 5 shows a fourth embodiment of the present invention. The basic composition member in this embodiment is an acoustic material in which a V-shaped channel is provided in the penetrating opening so that the noise source cannot be seen even when the penetrating plane is viewed from any direction. The sound incident on the penetrating plane collides against a wall surface 9 consisting of a V-shaped basic sound absorbing member 8, and is absorbed.

Figure 6:
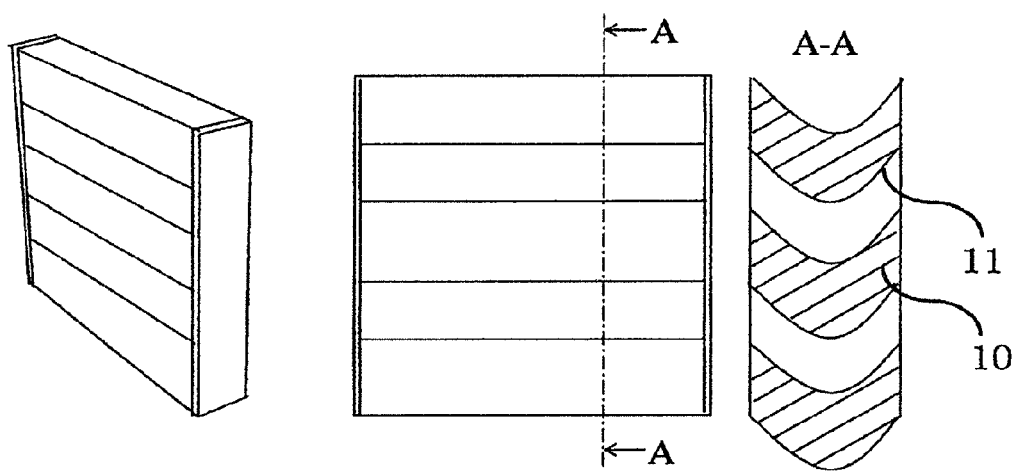
FIG. 6 is front and side views of a fifth embodiment of the present invention.

FIG. 6 shows a fifth embodiment of the present invention. The basic composition member 10 in this embodiment is an acoustic material in which a U-shaped channel is provided in the penetrating opening so that the noise source cannot be seen even when the penetrating plane is viewed from any direction. The sound incident on the penetrating plane collides against a surface 11 of the U-shaped basic sound absorbing member 10, and is absorbed.

Figure 7:
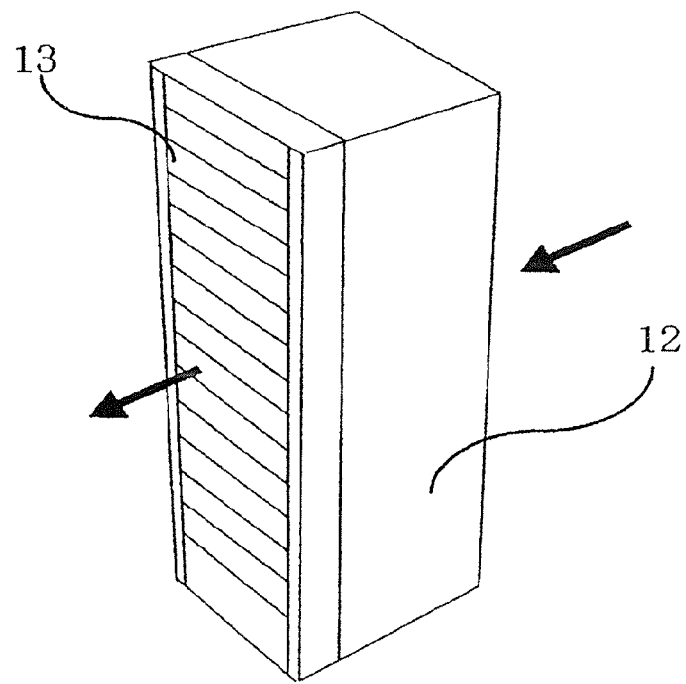
FIG. 7 is a general view of a sixth embodiment of the present invention.
Figure 8:
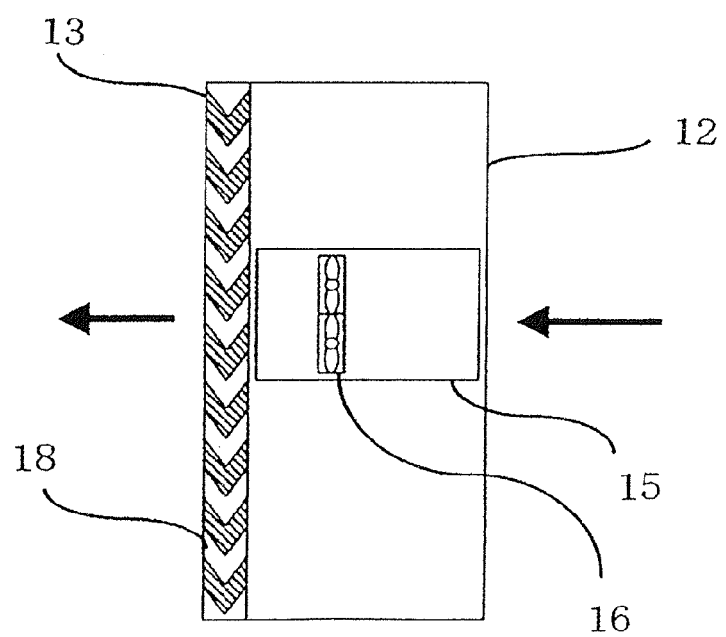
FIG. 8 is a side sectional view of the sixth embodiment of the present invention.
Figure 9:
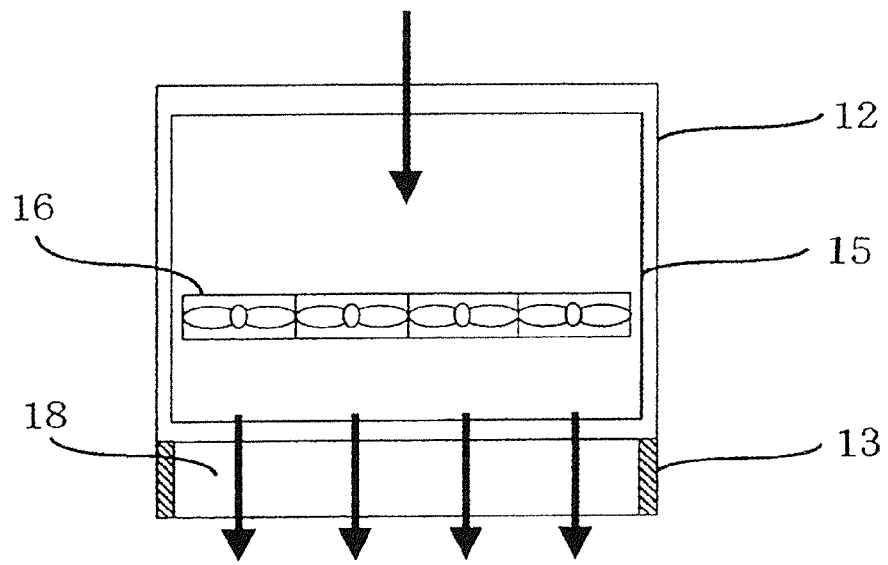
FIG. 9 is a top sectional view of the sixth embodiment of the present invention.

A general view of a sixth embodiment of the present invention is shown in FIG. 7, a side sectional view is shown in FIG. 8, and a top sectional view is shown in FIG. 9. In this embodiment, the sound absorbing structure is configured by mounting a plurality of basic sound absorbing members on a standard rack for mounting electronic equipment 15, so as to provide a V-shaped channel 18. In the standard rack 12 on which the electronic equipment is mounted, by attaching an acoustic material 13 of the invention to the whole area of a rack door on an exhaust side of the electronic equipment, maintenance of the cooling capability of the electronic equipment, and reduction of the noise can be achieved with compact volume. In addition, the invention can be applied to a standard rack of a low height only by decreasing the number of the sound absorbing members while using the same sound absorbing members.

According to the invention, a large number of penetrating openings having an inclined or curved channels are provided in a sound absorbing structure portion so that a blower 16 cannot seen when a penetrating plane is viewed from the front. That is, two or more acoustic materials are arranged so that the sound vertically incident on the penetrating plane from the blower does not directly go out of the electronic equipment. When installing the acoustic materials in an air intake and discharge direction of the blower for cooling of the electronic equipment, the ventilation resistance can be reduced in comparison with an acoustic material with no penetrating opening since the intake and discharge air passes through the penetrating opening. Further, since the penetrating opening has an inclined or curved channel, when the sound is incident from the penetrating plane, the sound does not directly pass but collides against an inclined portion or a curved portion in the penetrating opening and is absorbed. Accordingly, a large volume is not necessary for the sound absorbing structure. Moreover, by setting the position and the size of the provided penetrating opening in a well-balanced state, the distribution of the cooling fluid before and behind the penetrating opening, and the pressure loss generated when the cooling fluid passes can be made uniform.

In addition, because this sound absorbing structure portion is divided into units per certain basic unit, and a side plate supporting the sound absorbing structure portion and a sound absorbing part are connected by a screw and the like so as to be movable, the installation position, the number, and the angle (with respect to the cooling fluid) of the basic units can changed, which makes it possible to cope with the change in allowable fluid resistance of the target electronic equipment due to alternation of generations of a CPU, without preparing a new member.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A sound absorbing structure for electronic equipment having a cooling structure for taking air in through a back side or a front side of a rack cabinet and discharging the air through the front side or back side of the rack cabinet using a blower, the sound absorbing structure comprising:
   a plurality of sound absorbing members each having an inclined shape with a predetermined width, height, and depth, and a plurality of penetrating openings formed by arranging the plurality of sound absorbing members in a height direction of the rack cabinet at predetermined intervals in a flow channel of cooling fluid flowing from the blower such that the blower cannot be seen through any of the penetrating openings; and
   a plate material that extends along the height and depth of the plurality of sound absorbing members such that the plate material is attached at both sides of the plurality of sound absorbing members.

2. Electronic equipment mounted in a rack cabinet, wherein the sound absorbing structure according to claim 1 is provided in a rack cabinet door disposed on an exhaust side or an intake side.

3. A sound absorbing structure for electronic equipment according to claim 1, wherein the sound absorbing member is glass wool or polyurethane foam.

4. A sound absorbing structure for electronic equipment having a cooling structure for taking air in through a back side or a front side of a rack cabinet and discharging the air through the front side or back side of the rack cabinet using a blower, the sound absorbing structure comprising:
   a plurality of sound absorbing members each having a V-shape with a predetermined width, height, and depth, and a plurality of penetrating openings formed by arranging the plurality of sound absorbing members in a height direction of the rack cabinet at predetermined intervals in a flow channel of cooling fluid flowing from the blower such that the blower cannot be seen through any of the penetrating openings; and
   a plate material that extends along the height and depth of the plurality of sound absorbing members such that the plate material is attached at both sides of the plurality of sound absorbing members.

5. Electronic equipment mounted in a rack cabinet, wherein the sound absorbing structure according to claim 4 is provided in a rack cabinet door disposed on an exhaust side or an intake side.

6. A sound absorbing structure for electronic equipment according to claim 4, wherein the sound absorbing member is glass wool or polyurethane foam.

7. A sound absorbing structure for electronic equipment having a cooling structure for taking air in through a back side or a front side of a rack cabinet and discharging the air through the front side or back side of the rack cabinet using a blower, the sound absorbing structure comprising:
   a plurality of sound absorbing members each having a U-shape with a predetermined width, height, and depth, and a plurality of penetrating openings formed by arranging the plurality of acoustic materials in a height direction of the rack cabinet at predetermined intervals in a flow channel of cooling fluid flowing from the blower such that the blower cannot be seen through any of the penetrating openings; and
   a plate material that extends along the height and depth of the plurality of sound absorbing members such that the plate material is attached at both sides of the plurality of sound absorbing members.

8. Electronic equipment mounted in a rack cabinet, wherein the sound absorbing structure according to claim 7 is provided in a rack cabinet door disposed on an exhaust side or an intake side.

9. A sound absorbing structure for electronic equipment according to claim 7, wherein the sound absorbing member is glass wool or polyurethane foam.

* * * * *